United States Patent [19]

Mandel

[11] Patent Number: 5,993,747
[45] Date of Patent: *Nov. 30, 1999

[54] MIXING SYSTEM FOR PROCESSES USING SUPERCRITICAL FLUIDS

[75] Inventor: Frederick S. Mandel, Chagrin Falls, Ohio

[73] Assignee: Ferro Corporation, Cleveland, Ohio

[*] Notice: This patent is subject to a terminal disclaimer.

[21] Appl. No.: 08/882,022

[22] Filed: Jun. 25, 1997

[51] Int. Cl.$^6$ ................................................ G05B 13/00
[52] U.S. Cl. ........................ 422/119; 422/111; 422/105; 422/112; 422/62; 422/243; 422/129; 422/208
[58] Field of Search .................................. 422/119, 105, 422/115, 116, 110, 88, 111; 118/663

[56] References Cited

U.S. PATENT DOCUMENTS

| | | | |
|---|---|---|---|
| 3,078,265 | 2/1963 | Berger et al. | 422/135 |
| 3,227,526 | 1/1966 | Scoggin | 422/111 |
| 3,926,738 | 12/1975 | Nyiri et al. | 195/127 |
| 3,981,957 | 9/1976 | van Brederode et al. | 264/12 |
| 4,012,461 | 3/1977 | van Brederode | 264/12 |
| 4,582,731 | 4/1986 | Smith | 427/421 |
| 4,734,227 | 3/1988 | Smith | 264/13 |
| 4,734,451 | 3/1988 | Smith | 524/493 |
| 4,824,570 | 4/1989 | Bethuel et al. | 210/511 |
| 4,898,673 | 2/1990 | Rice et al. | 210/634 |
| 4,970,093 | 11/1990 | Sievers et al. | 427/38 |
| 5,009,367 | 4/1991 | Nielson | 239/3 |
| 5,027,742 | 7/1991 | Lee et al. | 118/300 |
| 5,171,613 | 12/1992 | Bok et al. | 427/422 |
| 5,180,558 | 1/1993 | Takakarhu | 422/119 |
| 5,290,827 | 3/1994 | Shine | 523/340 |
| 5,380,485 | 1/1995 | Takahashi et al. | 422/62 |
| 5,399,597 | 3/1995 | Mandel et al. | 523/342 |
| 5,407,267 | 4/1995 | Davis et al. | 366/152 |
| 5,698,163 | 12/1997 | Mandel | 422/105 |

FOREIGN PATENT DOCUMENTS

WO9409913  5/1994  WIPO.

OTHER PUBLICATIONS

Karen A. Larson et al., "Evaluation of Supercritical Fluid Extraction in the Pharmaceutical Industry," Biotechnology Progress, vol. 2, No. 2., Jun. 1986, pp. 73–82.

G. A. M. Diepen et al., "The Solubility of Naphthalene in Supercritical Ethylene," Dec. 1948, pp. 4085–4089.

Mark McHugh et al., "Solid Solubilities of Naphthalene and Biphenyl in Supercritical Carbon Dioxide," Journal of Chemical Engineering Data, vol. 25, No. 4, 1980, pp. 326–329.

Hongju Chang et al., "Solubilities of Methoxy–1–tetralone and Methly Nitrobenzoate Isomers and Their Mixtures in Supercritical Carbon Dioxide," Journal of Chemical Engineering Data, vol. 30, No. 1, 1985, pp. 74–78.

(List continued on next page.)

*Primary Examiner*—Hien Tran
*Assistant Examiner*—Susan Ohorodnik
*Attorney, Agent, or Firm*—Rankin, Hill, Porter & Clark LLP

[57] ABSTRACT

Apparatus for a process using supercritical fluid includes a pressure vessel including an agitator for mixing a batch of materials therein; a source of process media supplied to the pressure vessel in a supercritical state; first delivery devices for introducing into the pressure vessel batch materials that are mixed in the presence of the process media in a supercritical state to produce a reaction mixture based on a selectable reaction process; a receiver vessel; and second delivery devices for controlling transfer of the reaction mixture to the receiver vessel; the source comprising a tank for holding a selectable mass of the process media in a supercritical state and for supplying the process media on demand during the reaction process and during delivery of the reaction mixture to the receiver vessel.

17 Claims, 6 Drawing Sheets

OTHER PUBLICATIONS

Ronald T. Kurnik et al., "Solubility of Solids in Supercritical Carbon Dioxide and Ethylene," Journal of Chemical and Engineering Data, vol. 26, No. 1, 1981, pp. 47–51.

Yu V. Tsekhanskaya et al., "Volume Changes In Naphthalene Solutions In Compressed Carbon Dioxide," Russian Journal of Physical Chemistry, vol. 40, No. 9, Sep. 1966, pp. 1152–1156.

Walter Cobbs et al., "High Solids Coatings Above 80% By Volume," presented at the Water–Borne & Higher Solids Coatings Symposium, Mar. 10–12, 1980, New Orleans, LA, pp. 175–192.

Copy of U.S. application Serial No. 08/882,118 filed Jun. 25, 1997.

Copy of U.S. application Serial No. 08/882,707 filed Jun. 25, 1997.

Copy of U.S. Application Serial No. 08/810.965 filed Feb. 27, 1997.

MIXING SYSTEM FOR PROCESSES USING SUPERCRITICAL FLUIDS

BACKGROUND OF THE INVENTION

The invention relates generally to apparatus for carrying out a process that uses supercritical fluids, such as, for example, a process for preparing coating materials as described in U.S. Pat. No. 5,399,597 and co-pending U.S. patent application Ser. No. 08/438,681 entitled "CONTROL SYSTEM FOR PROCESSES USING SUPERCRITICAL FLUID", the entire disclosures of which are both fully incorporated herein by reference. More specifically, the invention relates to improvements and alternative embodiments of the mixing system including the pressure vessel and agitator that are part of the overall system described in the aforementioned disclosures.

The systems described in the referenced disclosures are effective for many processes that use supercritical fluids. However, improvements in the delivery and recovery systems for the process media have been discovered which can significantly improve the overall performance and quality of the finished product for different reaction processes.

The systems described in the above-identified references include pumps for delivering the process media to the reactor vessel (also referred to herein as the pressure vessel) in a supercritical state. The delivery system includes a surge accumulator to dampen pressure surges from pump activation, and also includes a heat exchanger to control the media temperature while the media is pumped to the pressure vessel. It has been empirically observed that control of the flow of the process media to the pressure vessel is an important aspect of the overall system performance. Delivery of the media is important during both the reaction process within the pressure vessel as well as during delivery of the finished reaction mixture from the pressure vessel to the receiver vessel. The delivery process in particular places significant demands on the control system in order to assure isobaric delivery of the finished reaction to the receiver vessel. In order to meet the substantial demand for mass flow of the process media, large pumps are typically required. However, in some applications, particularly pilot plants for example, the use of large pumps may not be a suitable solution due to noise, power requirements, space and so forth.

Recovery of the process media is also an important aspect of the overall system described in the referenced disclosures. Recovery of the process media includes the need to determine the condition of the media after the reaction process. For example, knowledge of whether material has dissolved in the process media can be important for determining what level of distillation is required in order to recover the process media in a condition that it can be used for another reaction process without contaminating the new process.

The objectives exist, therefore, to provide a process media delivery and recovery system that improves the flexibility and utility of supercritical process systems as such as are described in the aforementioned disclosures.

SUMMARY OF THE INVENTION

To the accomplishment of the foregoing objectives, the invention contemplates, in one embodiment, apparatus for a process using supercritical fluid, comprising a pressure vessel including an agitator for mixing a batch of materials therein; a source of process media supplied to the pressure vessel in a supercritical state; first delivery means for introducing into the pressure vessel batch materials that are mixed in the presence of the process media in a supercritical state to produce a reaction mixture based on a selectable reaction process; a receiver vessel; and second delivery means for controlling transfer of the reaction mixture to the receiver vessel; said source comprising a tank for holding a selectable mass of said process media in a supercritical state and for supplying said process media on demand during the reaction process and during delivery of the reaction mixture to the receiver vessel.

The invention also contemplates in another embodiment apparatus for a process using supercritical fluid, comprising: a pressure vessel including an agitator for mixing a batch of materials therein; a source of process media supplied in a supercritical state to the pressure vessel; control means for introducing into the pressure vessel batch materials that are mixed in the presence of the supercritical process media to produce a reaction mixture based on a selectable reaction process; a receiver vessel; delivery means for controlling transfer of the reaction mixture from the pressure vessel to the receiver vessel; and a recovery system for the process media; said recovery system comprising a main condenser for condensing vaporous process media from the pressure and receiver vessels to a liquid state; and a sampling system for detecting characteristics of the recovered process media; said sampling system comprising at least one cyclonic separator in fluid communication with the receiver vessel, and a first control device for selectively permitting a portion of the process media in the receiver vessel to enter said cyclonic separator.

These and other aspects and advantages of the present invention will be readily understood and appreciated by those skilled in the art from the following detailed description of the invention with the best mode contemplated for practicing the invention in view of the accompanying drawings.

DETAILED DESCRIPTION OF THE INVENTION

Figure 1A:
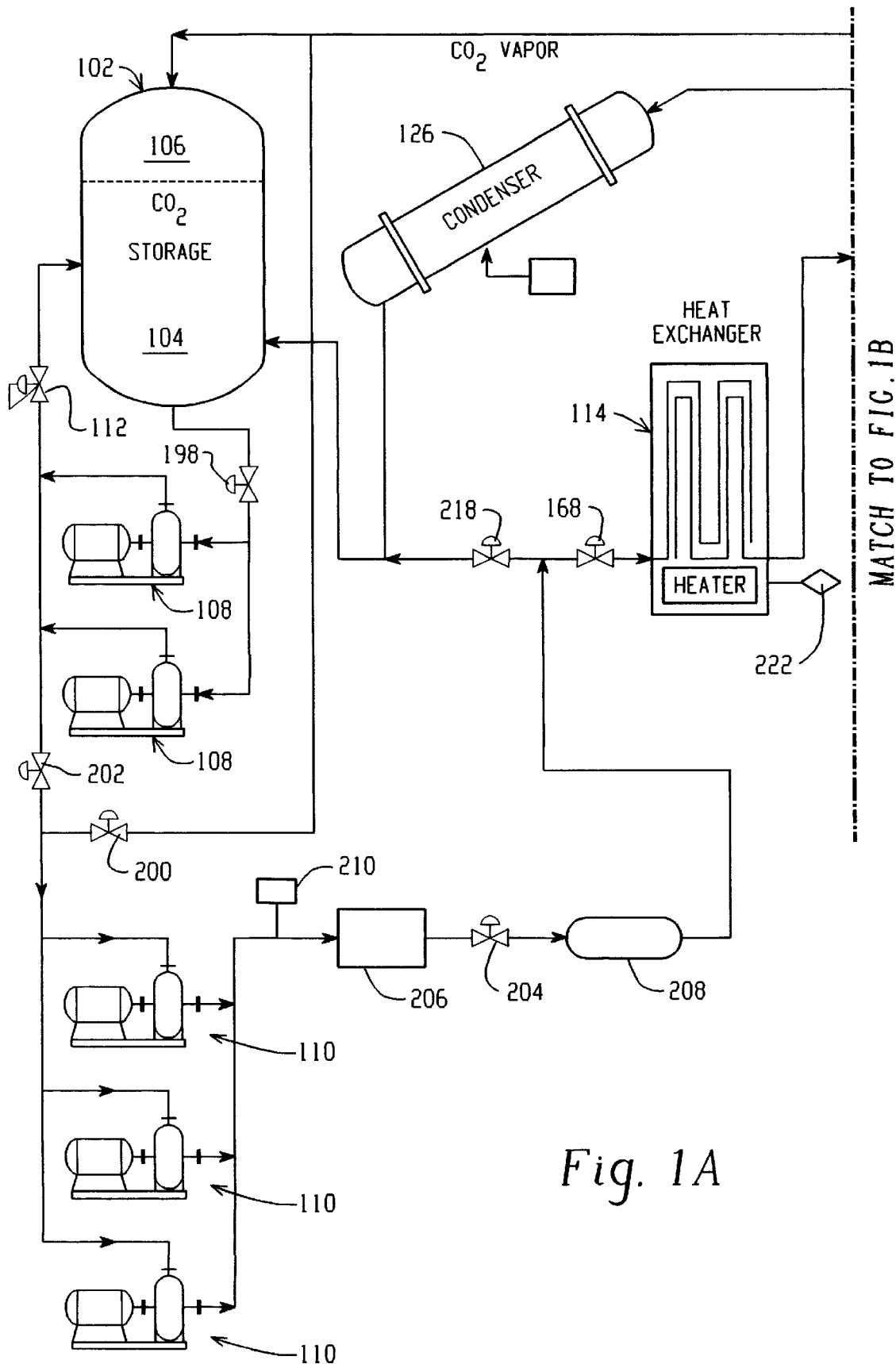
FIG. 1 is a simplified schematic representation of a supercritical process control system as used with the present invention.
Figure 1B:
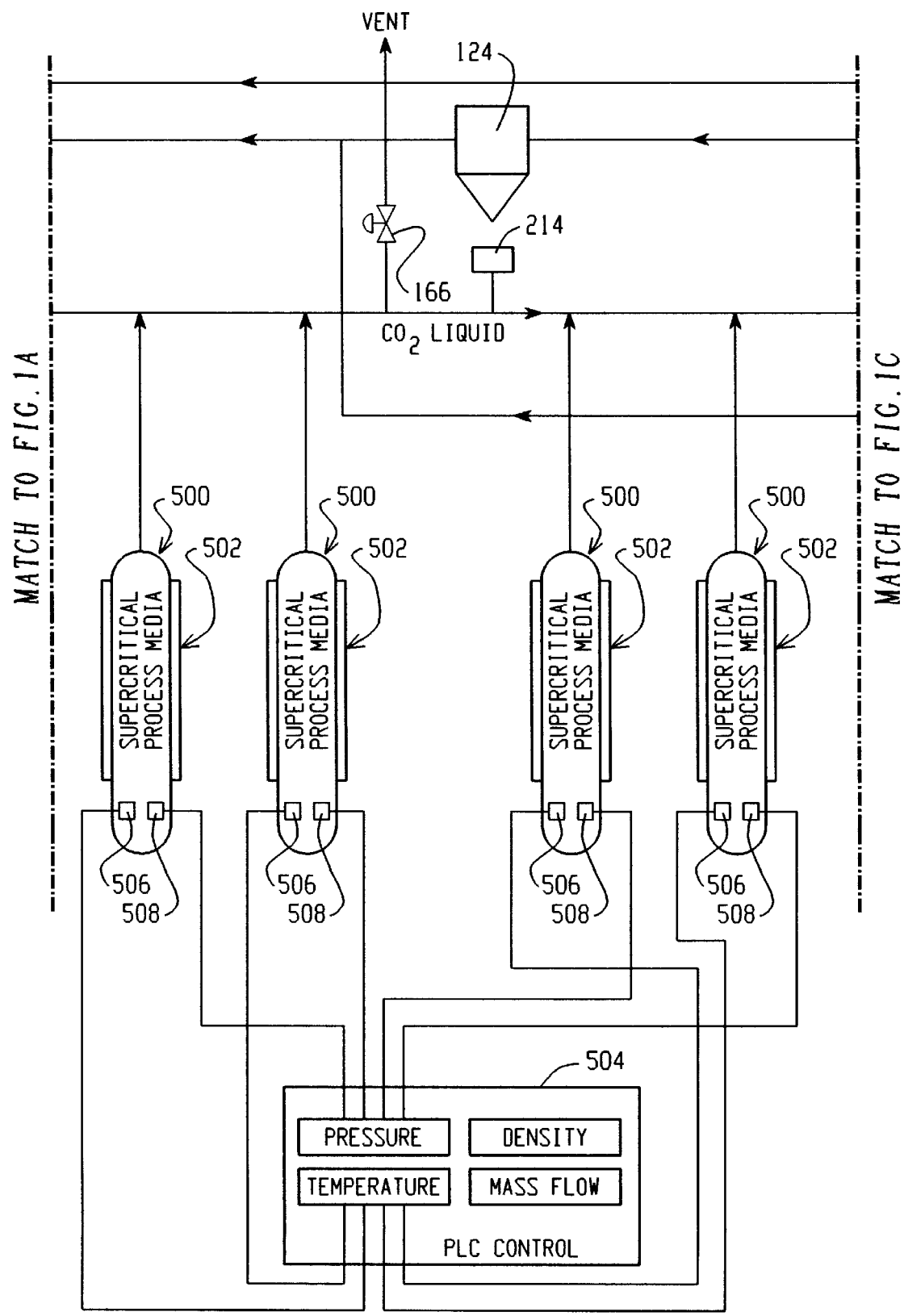
Figure 1C:
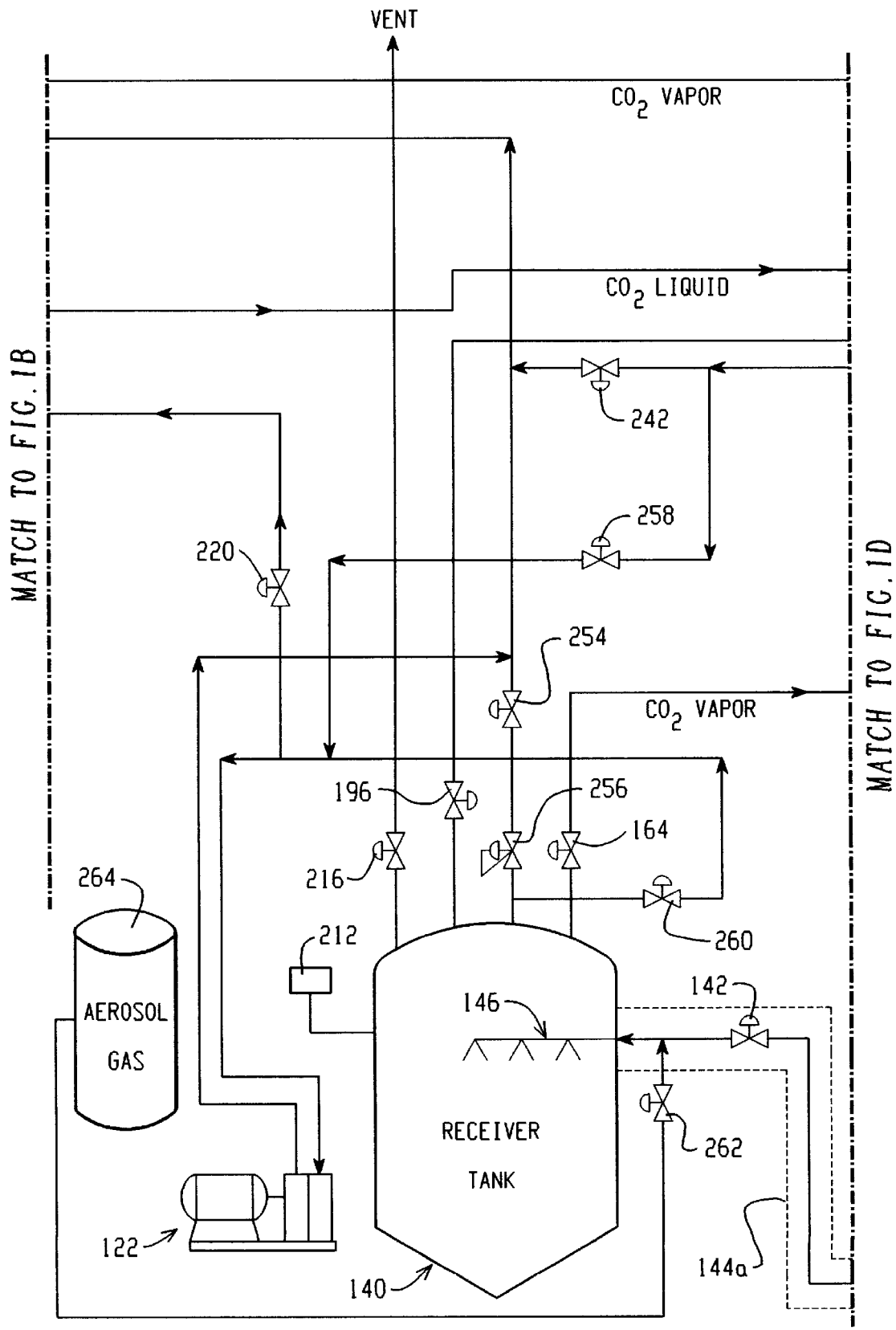

With reference to FIGS. 1A–1D, there is illustrated in schematic form a process control system for supercritical process media These drawings correspond in most respects to FIGS. 3A–3C of the disclosure in co-pending application Ser. No. 08/438,681 incorporated herein above. Accordingly, many of the details concerning the operation and control of the overall system are provided in the referenced disclosures, and reference can be made thereto for further explanation of the reaction processes and controls. To the extent that FIGS. 1A–1C differ from the co-pending disclosures, reference numerals of 500 and greater are used in the drawings, in conjunction with the accompanying explanation hereinafter. In particular, one aspect of the present invention is directed to the delivery of the process media, in this exemplary case carbon dioxide, in a supercritical state to the pressure vessel or reactor tank 120. Liquid $CO_2$ is stored in a storage tank 102 (FIG. 1A) and is drawn from the tank 102 into the system by a series of high pressure liquid pumps 110. A surge accumulator 208 is provided downstream of the pumps 110 to dampen pressure fluctuations, for example, when the pumps 110 are turned on or when various flow control valves are opened and closed. The liquid $CO_2$ is pumped through a heat exchanger 114 which can be used to control the temperature of the process media during pumping.

In accordance with one aspect of the present invention, a series of large cylindrical accumulator tanks 500 are provided which serve as large mass/volume accumulators for the process media. For example, four such tanks may store 1.3 cubic meters. The size of the tanks 500 will be determined in part by the mass of process media that may be demanded for each selectable reaction process. Suitable tanks can be made of carbon steel, for example, when the process media is an inert compound such as $CO_2$, to meet applicable safety code requirements for pressure and temperature. The accumulator tanks 500 are used to both store and deliver the process media as demanded or required for the selected reaction process being carried out in the pressure vessel 120, as well as to provide the required process media for transfer of the finished reaction from the pressure vessel 120 to the receiver vessel 140. In this exemplary embodiment, a globe valve 116 is used for the liquid feed valve of the earlier embodiment. A suitable globe valve is part no. 27039D-IP available from Kammer Valve Co. In accordance with one aspect of the invention, the large volume accumulators 500 and the globe valve 116 simulate a large mass displacement pump for delivering precisely controlled mass of the process media in a supercritical state to the pressure vessel 120. This arrangement thereby obviates the need for large pumps in the manufacturing facility. The size of the tanks 500 will depend on the delivery capacity required for the overall system. Large scale production facilities will typically use large pumps and mass flow meters to accomplish the transfer of process media into the pressure vessel. However, for many applications, particularly pilot plants, the accumulator/globe valve pump simulator can be a useful alternative to installing high capacity pumps in the plant facility.

Figure 1D:
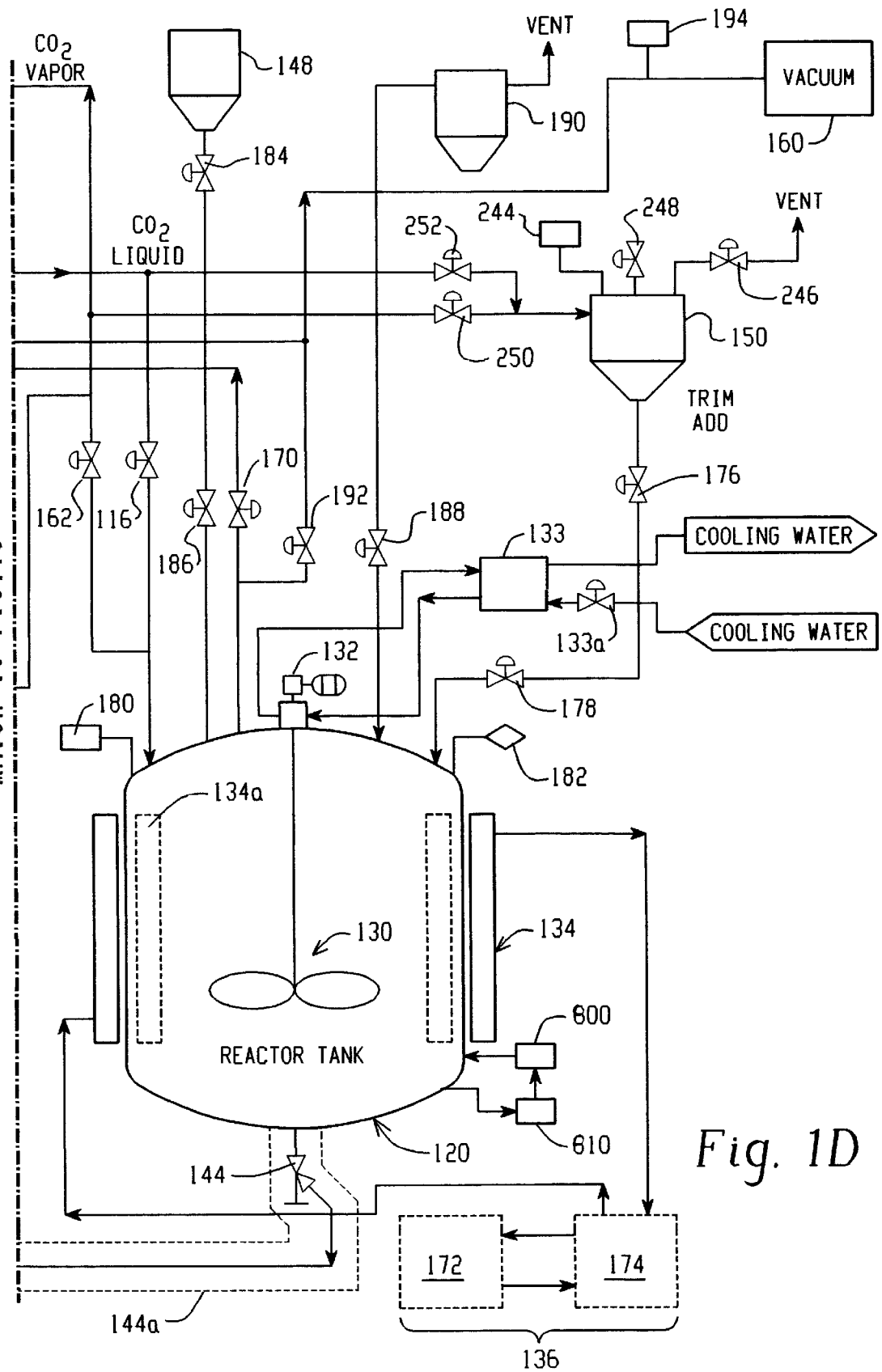

In another aspect of the invention, there is provided a schematic illustration in FIG. 1D of a filter 800 and pump 810 connected by piping to pressure vessel 120. When the process media and the materials being processed, in this case coating powder precursors, are completely mixed and at the required viscosity in vessel 120, pump 810 may be utilized to cycle the materials and process media through the filter one or more times. Of course, isolation valves (not shown) would be included and such valves would remain shut when the filtering operation is not desired. Proper viscosity of the mixture for filtering can be easily determined by monitoring the power consumption of the agitation system and making sure the supercritical fluid mixture's viscosity is sufficiently lowered to be passed through the filter 800. The viscosity of the mixture can be modified by altering the amount of process media and batch materials in vessel 120, and by controlling the temperature degree of agitation and pressure of the mixture contained in vessel 120. For use in the production of coating powders, preferably, filter 800 has a filter capacity of one micron or greater. Also, it will be appreciated that filter 800 may comprise multiple filters arranged in a parallel or series fashion. Also, it will be appreciated that the filtering operation may be conducted prior to the addition of all of the separate materials that are intended to be processed in vessel 120.

The filtering system on vessel 120 is desirable because automobiles and related products are many times coated with a clear coating known as an overcoat. These materials must possess good optical properties and be free of high molecular weight reaction products as well as extraneous materials such as fibers. Coating powders or powder coating materials possess properties that are ideally suited for producing excellent overcoat finishes if higher molecular weight fractions are removed as well as assuring that extraneous materials are removed. Current liquid paint formulations are many times filtered as a final step when producing such liquid coatings. However, since these paints are dissolved in active solvents their apparent viscosity's are greatly lowered and the ease of filterability is enhanced and the filters used can remove general impurities, but are not efficient in the removal of higher molecular weight fractions.

Resins and other polymers used in the production of powder coatings are often filtered as supplied by the manufacturer. However, prior to the present invention there existed no reliable method to filter the products prior to or after the conventional extrusion process. Thus, many packaging fibers and high molecular weight fractions can be introduced to the final product stream using the extrusion processes. Inclusion of these extraneous materials hinder the utilization of powder coating materials in the overcoating of products such as automobiles.

In accordance with another aspect of the invention, the accumulators 500 are each provided with heating and/or cooling jackets 502. These jackets can be, for example, realized in the form of copper tubing surrounding the tank 500. Internal heat/cool devices could alternatively be used. A suitable heat transfer fluid, such as brine or therminol, for example, can be pumped through each jacket 502 to maintain the process media in the tank 500 in a supercritical state. Internal temperature sensors 506 and pressure sensors 508 of conventional design are used to monitor the process media within each of the tanks 500. In this exemplary embodiment, the process media within the tanks 500 is kept in a supercritical state by controlling temperature, pressure and mass in accordance with a suitable equation of state for the process media, in this case $CO_2$. In order to maintain a suitable supply of mass of the process media in a supercritical state, a programmable logic controller (PLC) 504 or other suitable control system is used to monitor the temperature and pressure characteristics within each of the tanks and to produce suitable command signals to adjust the temperature and pressure within the tanks 500. The PLC 504 also controls operation of the feed valves 168 and 204 to control delivery of more mass to the tanks as needed. The PLC 504 is further programmed to calculate the mass of the media delivered to the pressure vessel 120 through the globe valve 116 based on the selected equation of state. A suitable equation of state for carbon dioxide is described in "AN ACCURATE EQUATION OF STATE", by Huang, Lee and Starling, Journal of Chemical Engineering of Japan, Vol. 18, No. 6 (1985) the entire disclosure of which is fully incorporated herein by reference. Other equations of state can also be used as required, for example, the NIST modified Benedict Webb Rubin (MBWR) equation of state as utilized by NIST-12. With the volume, pressure and temperature being known quantities, the density and mass of the process media in the tanks 500 can be determined, with the process media being maintained in a supercritical state by appropriate temperature, pressure and mass control. Alternatively, conventional load cells (not shown) can be placed within the tanks 500 to measure the mass change as the process media is either delivered to the pressure vessel 120 or received from the storage tank 102.

Unlike a typical accumulator application such as the surge accumulator 208, the high capacity accumulators 500 are used to store large mass of the process media at an elevated pressure and in a supercritical state in order to simulate in effect a pump. In this manner, precise and large quantities of the process media can be delivered to the pressure vessel on demand without having to operate large capacity pumps.

The PLC 504 can be a separate controller for the accumulators 500, or can be realized in the main control system (FIG. 2 in the above referenced disclosure) if so desired. Because the accumulators 500 and globe valve 116 simulate a pump, the process media within the accumulators 500 is maintained at a substantially higher pressure than the pressure of the pressure vessel 120. For example, the pressure vessel may typically be in the range of 3000 psi, for example, and the pressure within the accumulators 500 being in the range of 3500–3800 psi, for example. By measuring and controlling the pressure and temperature within the accumulators 500 during mass delivery of the process media to the pressure vessel 120, the transfer of the finished reaction from the pressure vessel 120 to the receiver vessel 140 can be performed isobarically to optimize control of the pressure drop at the inlet to the receiver vessel 140.

An important aspect of the overall control system exemplified in FIGS. 1A–1D is the ability to efficiently and cost-effectively recover the process media. Since many reaction processes can be selected using the control system, various properties of the batch materials may initially be unknown or not quantified. For example, different materials will exhibit different solubility characteristics for the selected process media, in this case, $CO_2$. Thus, it will be important to determine the amount, if any, of material dissolved in the process media, particularly after the finished reaction has been transferred from the pressure vessel 120 to the receiver vessel 140. Within the receiver vessel 140, ideally only the finished product, in the present case powder, and the process media (typically in a gaseous state) will be present. If only minute quantities of impurities are present in the process media in the receiver, then it will be possible to simply transfer the media directly back to the storage tank 102. If there is the possibility of entrained particulate in the media vapor, or dissolved material in the gas, then the recovered media is passed through the filter 124 and the condenser 126. A double distillation process may be required depending on the solubility of the materials in the process media. Process media can also recovered from the pressure vessel 120.

It is thus important, particularly for pilot plants or for other developmental conditions, to determine for various selectable processed the nature of the process media recovered from the system. It may also be important to quantify the extent to which batch materials are being lost or blown off (such as during mixing in the pressure vessel) during the reaction process.

Figure 2:
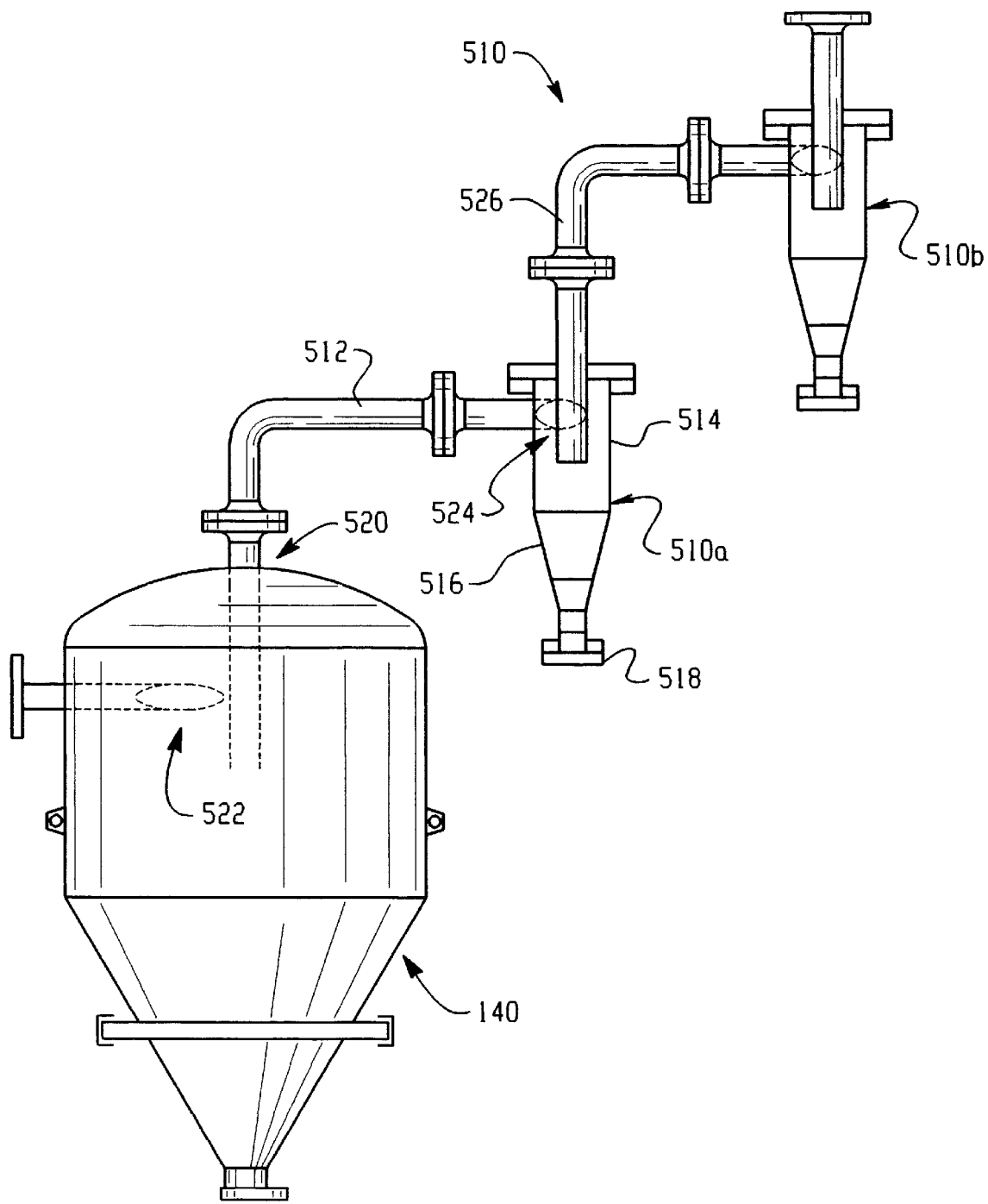
FIG. 2 is a schematic illustration of a first sampling system in accordance with the invention.

In accordance with this aspect of the invention, and with reference to FIG. 2, a pair of cyclone recovery separators 510 are provided. Piping 512 provides a fluid connection from the receiver vessel 140 to a first cyclonic separator 510a. Each cyclone 510 includes a cylinder 514 with a tapered conical section 516 at the bottom thereof. A flanged opening arrangement 518, such as a removable cover or cap, can be provided for access to the bottom of the cyclone interior for recovery of particulate material separated from the process media. The piping 512 opens at one end 520 into the upper region of the receiver vessel 140. In this embodiment, the receiver vessel 140 is also a cyclone which has a tangential opening 522 through which the finished reaction (powder mixture and the process media) is forced into the receiver 140 under high pressure. The cyclone structure of the receiver 140 produces a separation of the finished product, in this case coating powder, from the $CO_2$ process media The gaseous media exits the receiver 140 through the piping 512 under control of a valve or other suitable mechanism (not shown in FIG. 2).

Because the process media is under pressure, for example 300 psi, it is forced into the first cyclone 510a through a tangential opening 524. The first cyclone 510a operates to separate particulate material, such as powder, entrained in the process media from the process media. The separated material is collected at the bottom of the cyclone and can be removed for analysis from the opening 518. The gaseous process media exits from the first cyclone 510a through piping 526 into the second cyclone 510b. The second cyclone 510b is constructed in a similar manner as the first cyclone 510a. Particulate material entrained in the process media that was not separated during the first cyclone pass can be separated in the second cyclone 510b. The gaseous process media then exits the second cyclone 510b to a bag filter (not shown) and then to a suitable collection device such as the tank 102 or the condenser 126 for example. If analysis of the type and quantity of particulate matter separated from the process media indicates little blow off or loss of batch materials, then direct recovery or recycling of the process media to a storage tank or condenser can be realized for that particular reaction process. If material is being lost, then additional filtering is indicated prior to recycling the process media to the storage tank or condenser. The cyclones 510 could be used for experimental purposes for analyzing each reaction process, or could be included in a production facility as part of a process quality control system.

In addition to entrained particulate material, various reaction processes could involve the loss of batch material due to materials having different solubility characteristics in the chosen process media. The present invention provides apparatus for analyzing this condition in order to determine the extent, if any, that a distillation or other separation technique needs to be used to purify the process media prior to the next reaction process run.

Figure 3:
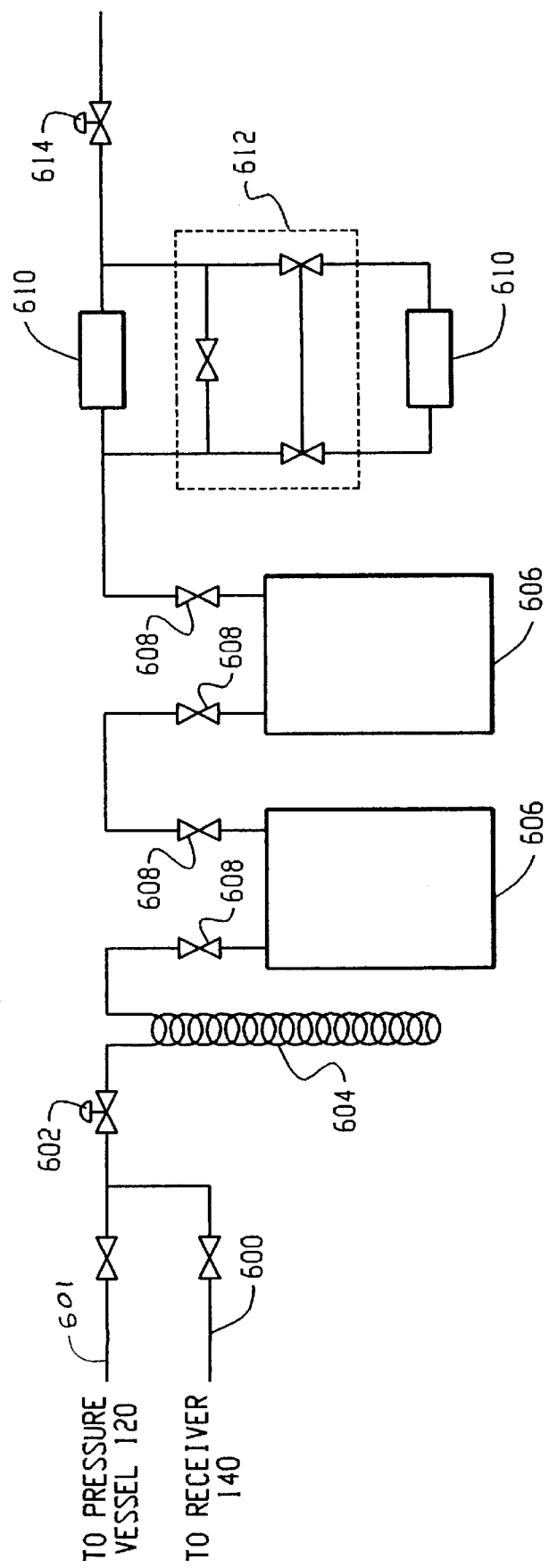
FIG. 3 is a schematic illustration of a second sampling system in accordance with the invention.

With reference to FIG. 3, a sampling apparatus for analysis of the process media includes piping 600 connected at one end to an opening to the receiver vessel 140. Additional piping 601 can be used to connect the sampling apparatus to a vent on the pressure vessel 120. A sample flow control valve 602 is used to control each sampling event. Control valves 188 and 216 can be used to control which vessel 120, 140 is sampled when the sample control valve 602 is opened. Samples can be taken at any time before, during and/or after the transfer of material from the pressure vessel 120 to the receiver vessel 140, for example. The piping 600 at its outlet side is connected to a condenser coil 604 which is used to liquify the gaseous process media. Fluid flow from the receiver 140 to the sampling system is effected by the fact that the process media is under pressure within the vessel 140, for example, around 300 psi (or in the case of the pressure vessel 120, at about 3000 psi).

From the condenser 604 the liquid process media flows into and through a series of one or more collection vessels 606. Each vessel 606 may include a temperature bath, with the internal collection chamber at a reduced temperature to precipitate out material dissolved in the process media. Flow shutoff valves 608 are used to isolate the vessels 606 from the fluid circuit. The vessels 606 can then be removed, or the contents extracted, and the contents thereof analyzed by any number of conventional techniques such as gas chromatography, mass spectroscopy, NMR and infrared analysis to name a few, in order to determine the nature and quantity of material dissolved in the process media.

A series of one or more filters 610 can be provided downstream of the collection vessels 606 to further capture material entrained in the process media that was not removed by the precipitation process. A number of control valves 612 can be used as required to control flow of the process media through the filters. A return control valve 614 is provided to control release of the process media back to the system supply. The control valves 602 and 614 can be actuated by any convenient means such as manually, pneumatically, electrically or hydraulically. Typically, the isolation valves 608, 612 will be controlled manually as part of the sampling procedure, but manual operation is not required.

The analysis of the process media leaving the receiver vessel 140 is useful for determining what purification steps, such as single or double distillation processes, may be needed to recycle the process media for use in the next selected reaction process. As indicated in FIG. 3, additional sampling apparatus can be employed, for example, to sample process media released from the pressure vessel 120 (although typically this process media will require filtering and distillation before it can be returned to the process media supply 104), or at any other location in the overall system where the possibility of soluble materials in the process media may present a problem.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Apparatus for a process using supercritical fluid, comprising:
    a pressure vessel including an agitator for mixing a batch of materials therein;
    a source connected to the pressure vessel for supplying process media to the pressure vessel in a supercritical state;
    first delivery means for introducing batch materials into the pressure vessel that are mixed in the presence of the process media in a supercritical state to produce a reaction mixture based on a selectable reaction process;
    a receiver vessel connected to the pressure vessel; and
    second delivery means for controlling transfer of the reaction mixture to the receiver vessel;
    said source comprising a tank including means for holding a selectable mass of said process media in a supercritical state and means for supplying said process media to the pressure vessel on demand during the reaction process and during delivery of the reaction mixture to the receiver vessel.

2. The apparatus of claim 1 wherein said source includes a system for measuring and controlling the pressure and temperature within said tank during delivery of the process media to the pressure vessel to allow for isobaric transfer of the reaction mixture to the receiver vessel.

3. The apparatus of claim 1 wherein said source comprises first control means for maintaining the process media in a supercritical state within said tank, and for controlling the input of additional mass of said process media into the tank as demand for the process media increases during the selected reaction process and during delivery of the reaction mixture to the receiver vessel.

4. The apparatus of claim 3 wherein said first control means comprises temperature and pressure control means for adjusting temperature of the process media inside said tank to maintain the process media in a supercritical state including periods during which the mass of the process media within said tank changes.

5. The apparatus of claim 4 comprising a valve for controlling flow of the process media from said tank to the pressure vessel; said source and said valve cooperating to simulate a pump means to provide a high pressure supply of the process media to the pressure vessel on demand without the use of high pressure pumping apparatus.

6. The apparatus of claim 5 comprising second control means for executing the selected reaction process by controlling operation of said agitator, said first delivery means, said second delivery means and said source; said first control means operating in conjunction with said second control means to maintain a selected mass of the process media in a supercritical state in said tank on demand from said second control means.

7. The apparatus of claim 4 wherein said first control means comprises a programmable logic controller that produces command signals to adjust the temperature and pressure of the process media in said tank based on a selected equation of state to compensate for mass changes in said tank.

8. Apparatus for a process using supercritical fluid, comprising:
    a pressure vessel including an agitator for mixing a batch of materials therein;
    a storage tank for storing process media in a liquid state;
    a source connected between the storage tank and the pressure vessel for supplying process media in a supercritical state to the pressure vessel;
    control means for introducing batch materials into the pressure vessel that are mixed in the presence of the supercritical process media to produce a reaction mixture based on a selectable reaction process;
    a receiver vessel connected to the pressure vessel;
    delivery means for controlling transfer of the reaction mixture from the pressure vessel to the receiver vessel; and
    a recovery system for the process media;
    said source comprising a tank including means for holding a selectable mass of said process media in a supercritical state and means for supplying said process media to the pressure vessel on demand during the reaction process and during delivery of the reaction mixture to the receiver vessel;
    said recovery system comprising a main condenser connected on an input side by piping from the pressure vessel and the receiving vessel and on an output side by piping connected to the storage tank for condensing vaporous process media from the pressure and receiver vessels to a liquid state; and a sampling system for detecting characteristics of the recovered process media;
    said sampling system comprising at least one cyclonic separator in fluid communication with the receiver vessel, and a first control device for selectively permitting a portion of the process media in the receiver vessel to enter said cyclonic separator.

9. The apparatus of claim 8 wherein said cyclonic separator includes an opening through which entrained particulate matter having been separated from the vaporous process media can be removed for analysis.

10. The apparatus of claim 8 further comprising a second sampling system comprising a first fluid circuit in fluid communication with the receiver vessel; a second control device for selectively permitting fluid communication between said fluid circuit and the receiver vessel to extract a sample quantity of the vaporous process media therefrom;

said first fluid circuit comprising first separator means for separating from the vaporous process media material soluble in the process media, and first meter means for determining the amount of material removed from the sample quantity of the process media extracted.

11. The apparatus of claim 10 wherein said first separator means comprises a temperature bath for condensing out material dissolved in the vaporous process media extracted from the receiver vessel.

12. The apparatus of claim 11 wherein said temperature bath comprises a sampling condenser and a collection vessel for collecting material separated from the vaporous process media.

13. The apparatus of claim 10 comprising a second fluid circuit in fluid communication with the pressure vessel; and a third control device for selectively permitting fluid communication between said second fluid circuit and the pressure vessel to extract a sample quantity of the vaporous process media therefrom.

14. The apparatus of claim 13 wherein said second fluid circuit comprises second separator means for separating from the vaporous process media material soluble in the process media, and second meter means for determining the amount of sample quantity of the process media extracted from the pressure vessel.

15. An apparatus as set forth in claim 8 wherein said pressure vessel includes a filter system connected by piping to form a loop for use in purifying said process media and said batch materials.

16. An apparatus as set forth in claim 15 wherein said filter system comprises at least one filter and at least one pump for pumping said process media and said batch materials through said filter.

17. The apparatus of claim 1 wherein said source further includes a system for measuring and controlling a first pressure value within said tank, a second pressure value within said pressure vessel, and a third pressure value within said receiving vessel; said system maintaining said first pressure value substantially higher than said second and third pressure values.

* * * * *